United States Patent
Sugimoto et al.

(10) Patent No.: US 9,962,787 B2
(45) Date of Patent: May 8, 2018

(54) FRICTION STIR WELDING METHOD, FRICTION STIR WELDING DEVICE AND FRICTION STIR WELDED MATERIAL

(71) Applicant: HITACHI, LTD., Tokyo (JP)

(72) Inventors: Itto Sugimoto, Tokyo (JP); Satoshi Hirano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days. days.

(21) Appl. No.: 14/912,680

(22) PCT Filed: Sep. 11, 2013

(86) PCT No.: PCT/JP2013/074460
§ 371 (c)(1),
(2) Date: Feb. 18, 2016

(87) PCT Pub. No.: WO2015/037071
PCT Pub. Date: Mar. 19, 2015

(65) Prior Publication Data
US 2016/0193689 A1  Jul. 7, 2016

(51) Int. Cl.
*B23K 20/12* (2006.01)
*C23C 26/00* (2006.01)
*H05B 7/18* (2006.01)
*H05B 7/20* (2006.01)

(52) U.S. Cl.
CPC .......... *B23K 20/1245* (2013.01); *B23K 20/12* (2013.01); *B23K 20/122* (2013.01); *C23C 26/00* (2013.01); *H05B 7/185* (2013.01); *H05B 7/20* (2013.01)

(58) Field of Classification Search
None
See application file for complete search history.

(56) References Cited

U.S. PATENT DOCUMENTS

| | | | | |
|---|---|---|---|---|
| 7,208,695 | B2 * | 4/2007 | Kimura | B23K 35/383 219/137 WM |
| 2001/0030221 | A1 * | 10/2001 | Ogawa | B23K 35/3086 228/101 |
| 2009/0090700 | A1 * | 4/2009 | Sato | B23K 20/1225 219/117.1 |

(Continued)

FOREIGN PATENT DOCUMENTS

| | | | |
|---|---|---|---|
| CN | 102941402 A | * | 2/2013 |
| JP | 11-226757 A | | 8/1999 |

(Continued)

*Primary Examiner* — Devang R Patel
(74) *Attorney, Agent, or Firm* — Volpe and Koenig, P.C.

(57) ABSTRACT

A friction stir welding method for bonding a to-be bonded material, includes: a step of supplying nitrogen and introducing nitrogen into the to-be bonded material while melting the to-be bonded material; and a step of friction stir welding a portion of the non-bonded material in which the nitrogen is introduced. A friction stirring device for bonding a to-be bonded material, includes: a heating source for melting the to-be bonded material; a nitrogen supply source for supplying nitrogen to a melted portion of the to-be bonded material and introducing nitrogen into the to-be bonded material; and a friction stir tool for friction stir welding a portion of the non-bonded material in which the nitrogen is introduced.

4 Claims, 3 Drawing Sheets

(56) References Cited

U.S. PATENT DOCUMENTS

2009/0152328 A1* 6/2009 Okamoto ............ B23K 20/126
228/112.1

FOREIGN PATENT DOCUMENTS

| | | | |
|---|---|---|---|
| JP | 2003-089884 A | | 3/2003 |
| JP | 2004-090050 A | | 3/2004 |
| JP | 2004-195480 A | | 7/2004 |
| JP | 2007-237253 A | | 9/2007 |
| JP | 2008-264806 A | | 11/2008 |
| JP | 2009-142845 A | | 7/2009 |
| JP | 2010-046678 A | | 3/2010 |
| JP | 2010-209388 A | | 9/2010 |
| JP | 2012-035295 A | | 2/2012 |
| JP | 2012035295 A | * | 2/2012 |
| KR | 2005067970 A | * | 7/2005 |
| WO | WO 9908830 A1 | * | 2/1999 ........... B23K 26/146 |

* cited by examiner (a) EXAMPLE IN WHICH ROTATION TOOL IS PLACED ON BACK SURFACE (b) EXAMPLE IN WHICH BOBBIN TOOL IS USED (c) EXAMPLE IN WHICH TWO-SIDED CONVEXO-CONCAVE TOOLS ARE USED (d) EXAMPLE IN WHICH TOOL HAVING STATIONARY SHOULDER IS USED (e) EXAMPLE IN WHICH TWO-STAGE TOOL IS USED (f) CASE WHERE UNION JOINT IS USED

FRICTION STIR WELDING METHOD, FRICTION STIR WELDING DEVICE AND FRICTION STIR WELDED MATERIAL

TECHNICAL FIELD

The present invention relates to a friction stir welding method of metal, a friction stir welding device and a friction stir welded material.

BACKGROUND ART

Corrosion resistance of iron and steel material can be enhanced by adding an element such as chrome, molybdenum, tungsten and nitrogen, and various kinds of stainless steel materials and chrome molybdenum steel materials are utilized as a structure material existing in a corrosion environment. However, there is a problem that also in such high corrosion resistant iron and steel material, corrosion resistance is largely deteriorated at a welded portion. This is because that added elements such as chrome locally and unevenly exist in the welded portion, and corrosion occurs at a location where the elements are locally starved.

Friction stir welding (FSW) is a solid phase bonding method which makes a to-be bonded material plastically flow by stirring a location of the material heated by friction heat by a tool, thereby bonding the material. As compared with melt welding, treatment temperature of the friction stir welding is low, and heat influence on the bonding material is relatively small. Hence, the friction stir welding attracts attention as a dominant bonding technique for solving the problem of the deterioration of corrosion resistance in the bonded portion of iron and steel material having a large problem in stainless steel. For example, PTL 1 discloses a friction stir welding method of stainless steel material. PTL 2 discloses a high corrosion resistance surface treatment method to which the friction stir welding is applied.

CITATION LIST

Patent Literatures

PTL 1: JP 2008-264806 A
PTL 2: JP 2012-35295 A

SUMMARY OF INVENTION

Technical Problem

However, a friction stir welding method cannot solve the problem of the deterioration of a corrosion resistance in a bonded portion. For example, a method to limit a heat input amount by reducing the number of rotations of the tool to carry out the bonding operation can be considered, but if the heat input amount is reduced, a defect is prone to be generated in the bonded portion. If the number of rotations of the tool is reduced, bonding speed is lowered and temperature distribution becomes uneven, and these factors form chrome compound and grow granular ferrite, and the corrosion resistance in the bonded portion is not improved.

The object of the present invention is to enhance corrosion resistance even if metal is subjected to friction stir welding.

Solution to Problem

The above object is achieved by the invention described in claims.

Advantageous Effect of Invention

According to the present invention, it is possible to enhance corrosion resistance even if metal is subjected to friction stir welding.

DESCRIPTION OF EMBODIMENT

Figure 1:
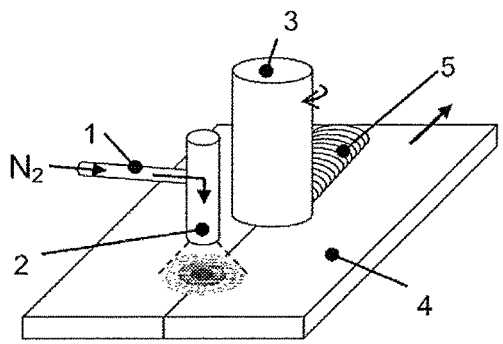
FIG. 1 illustrates a bonding device having a heating source, a nitrogen supply source, and friction stir equipment.

When the present inventors experimentally manufactured and studied friction stir welding, the inventors made, clear, a relation between a texture of a friction stir welded material and corrosion resistance. The friction stir welding is a solid phase bonding method in which a rotation tool is inserted into the friction stir welded material, the welded material is scanned along its bonding line, a location of the welded material heated by friction heat is stirred by the tool, thereby making a to-be bonded material plastically flow to bond the to-be bonded material to the welded material. A stirred zone is formed on a central portion of the bonded portion through which the tool passes, and a thermo mechanical affected zone (TMAZ) and a heat affected zone (HAZ) are formed at the outer side thereof. In the case of spot bonding in which only insertion and pulling out of the tool are carried out, laterally symmetric textures are formed, but in the case of line bonding in which the scanning operation is carried out along the bonding line, textures are formed asymmetrically in many cases. A side from a central line of the boding portion where a bonding direction and a rotation direction of the tool match with each other is called advancing side (AS), and a side from the central line of the boding portion where the bonding direction and the rotation direction of the tool are opposite from each other is called retreating side (RS).

When stainless steel is bonded by the conventional friction stir welding, excellent corrosion resistance is exerted at the central stirred zone, but corrosion starts from the thermo mechanical affected zone and the heat affected zone, and this tendency appears more remarkably on the RS than the AS. If nitrogen is introduced into the bonded portion, strong fine texture which is inherent in the friction stir welding is obtained, and high corrosion resistance can be obtained by introducing nitrogen.

The bonding method of the present embodiment includes a step of supplying nitrogen into a melted portion and introducing nitrogen into a to-be bonded material while melting bonded surfaces of a plurality of to-be bonded materials, and a step of friction stir welding the portion where the nitrogen is introduced. As a method of introducing nitrogen into iron and steel, salt bath nitriding, gas nitriding and plasma nitriding are conventionally widely utilized. In these methods, treatment temperature is set to low temperature of 700° C. or lower so that an outer size after the treatment is less prone to be changed, but a diffusion amount of nitrogen is small and treatment time is long. On the other hand, when a method of exposing nitrogen to the molten metal is used as in the present embodiment, although the outer shape is changed by melting, an amount of added element is largely increased. This is because heat conductivity of the molten metal is large at high temperature, and a convection effect of fluid is added. According to the bonding method of the present embodiment, a sufficient amount of nitrogen can be introduced within short time by the step of introducing nitrogen while melting, and variation in the outer shape caused by melting can be fixed up by the step of the friction stir welding. If this method is not used, a friction stir welded material having a sufficient amount of nitrogen cannot be formed.

In the bonding method of the present embodiment, the step of adding nitrogen and the step of friction stir welding can be carried out independently from each other, but it is more preferable that these steps are carried out continuously or at the same time. When the iron and steel are used as the to-be bonded material, an austenite phase which is stable at high temperature is formed, and austenite of an FCC structure can include more nitrogen. When ferrite which is stable at low temperature is formed on the other hand, a portion of nitrogen is discharged from grains and the nitrogen moves to a grain boundary or deposited material. If sufficiently high temperature is maintained after it is melted and the friction stir welding is carried out in a state where the austenite is maintained over a wide range, more nitrogen can be stored in the bonded portion. Hence, it is preferable that time between the step of adding nitrogen and the step of friction stir welding is short so that the to-be bonded material is not excessively cooled, and a method in which these steps are carried out continuously or at the same time is actually preferable. It is not preferable that the melting step is carried out after the step of friction stir welding. If it is melted by the latter step, coarse grains which are inherent in coagulated texture and a dendrite structure are formed in the treated bonded material, and the material is weakened.

FIG. 1 shows one example of the bonding device of the present embodiment. The bonding device which realizes the above-described bonding method includes a heating source 2 for locally melting at least a to-be bonded material 4, a nitrogen supply source 1 for supplying nitrogen to a portion melted by the heating source, and a friction stir tool 3 for friction stir welding the to-be bonded material in a state where nitrogen is introduced into the to-be bonded material. The bonding device continuously carries out the step of adding nitrogen and the step of friction stir welding. A reference sign 5 represents a bonding bead after the friction stir welding.

Arc discharge, a laser, gas flame, neutron radiation, a resistance heater, a microwave heater, a high frequency heater and an electric heater can be used as the heating source 2. Although the heating source is not especially limited, it is especially preferable that a heat source suitable for ionizing nitrogen is used. More specifically, it is preferable to use arc discharge and a carbon dioxide laser. An amount of introduced nitrogen into metal largely depends on a type of nitrogen. This is because ionized nitrogen has higher response as compared with molecule and atom, and the introduced amount increase.

Figure 2:
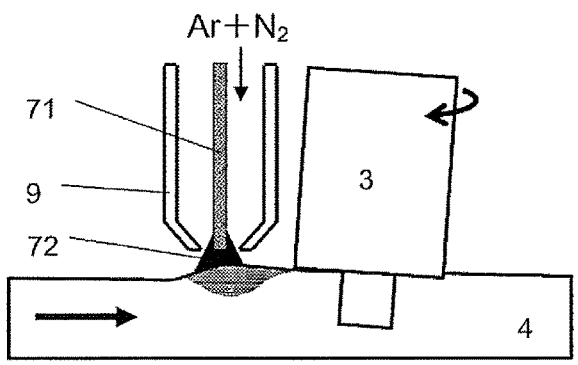
FIG. 2 illustrates the bonding device using arc discharge using a tungsten electrode as the heating source.

FIG. 2 shows an example in which arc discharge is used as the heating source. The arc discharge 72 can ionize a portion of gas which enters in the vicinity of electric arc. Therefore, there is an effect to largely increase the adding amount of nitrogen as compared with other heat sources. It is preferable that a non-consumable electrode such as tungsten and molybdenum is used as an electrode 71 which generates arc discharge. When the consumable electrode is used, an electrode component is mixed into the friction stir welded material, and this deteriorates the corrosion resistance and strength. Arc discharge using the non-consumable electrode is known as being utilized for tungsten inert gas (TIG) welding or plasma welding. Nitrogen passes through a shield wall 9 which surrounds the electrode, and discharge is generated in the vicinity of its outlet. According to this, it is possible to efficiently supply nitrogen to the melted to-be bonded material 4.

In the TIG welding and the plasma welding, the arc discharge is formed in inert gas such as argon and helium in many cases, but when nitrogen is mixed into the inert gas, a defect is formed by a blow hole or sputter, the electric arc becomes unstable and contamination is generated on a surface of the electrode in some cases. According to the present embodiment, the formed defect can be removed at the stage of the friction stir welding and thus, this does not become a problem. It is preferable to prevent instability of the electric arc and contamination of the electrode surface to obtain stable bonding quality.

Figure 3:
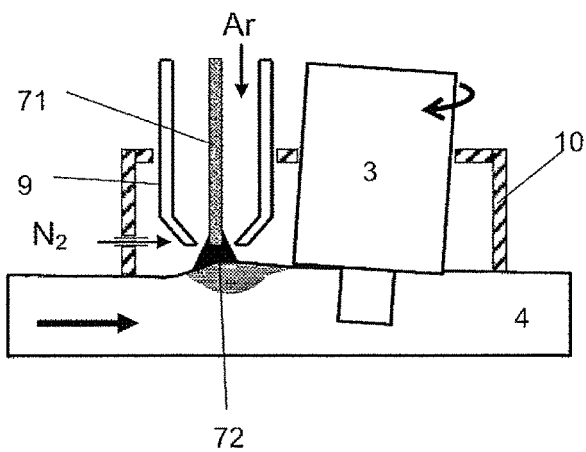
FIG. 3 illustrates the bonding device using two-layered shield equipment using arc discharge as the heating source.

When the arc discharge by the non-consumable electrode is used, it is more preferable to provided two-layered gas shields (FIG. 3). It is preferable that the inner gas shield which surrounds the electrode supplies only inert gas, and the outer gas shield is made as a device which supplies gas including nitrogen. More specifically, the gas shields are formed as two-layered gas shields, and only inert gas such as argon and helium is introduced into the inner shield wall 9, and the stable arc discharge 72 is maintained. An outer shield wall 10 covers the inner shield wall 9 and the melted portion, and gas including nitrogen is supplied in between the inner shield wall 9 and the outer shield wall 10 so that nitrogen can be added to the melted portion. According to this method, it is possible to prevent a large amount of nitrogen gas from floating in the vicinity of the electrode, and it is possible to bring nitrogen and arc discharge into contact with each other on the surface of the to-be bonded material at the same time.

When arc discharge is used as the heating source, in the following equation (1) expressing its heat input amount, E represents arc voltage, I represents arc current and V represents sending speed.

$$H = \frac{600 \times E \times I}{V} \text{ (J/cm)} \quad (1)$$

If a heat input amount H is 1 kJ/cm or higher, the to-be bonded material is melted up to its deep portion, and sufficient nitrogen can be included.

Figure 4:
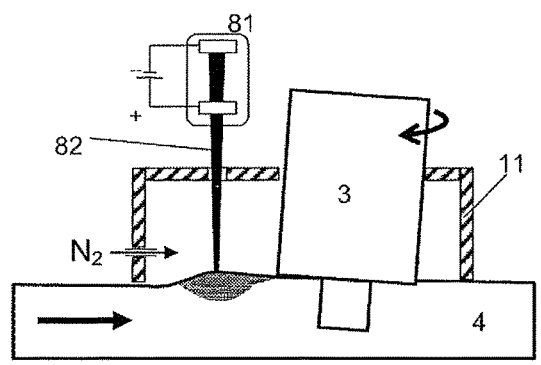
FIG. 4 illustrates a cross sectional structure of the bonding device using a carbon dioxide laser as the heating source.

When a laser is used as the heating source, it is preferable to use a laser having long wavelength and substantially, it is preferable to use a carbon dioxide laser (FIG. 4). Gas can be ionized by a carbon dioxide laser 82 generated by an optical resonator 81, and a sufficient amount of nitrogen can be added by the same effect as that of the arc discharge in an shield wall 11 which covers a melted portion.

FIGS. 5(a) to 5(f) are sectional views of an example of the bonding device as viewed from side. In the friction stir welding, it is general that a rotation tool having a shoulder and a probe whose diameter is smaller than that of the shoulder is used. The probe is provided on a tip end of the shoulder. Alternatively, a convenient tool or a device structure may be employed while taking a shape of a joint and design likelihood into consideration.

Figure 5:
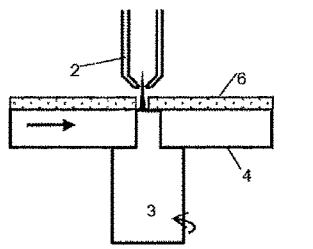
FIGS. 5(a) to 5(f) illustrate a cross sectional structure of an arrangement example of the heating source and a friction stir tool.
Figure 5:
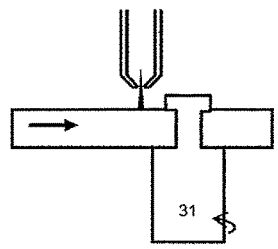
Figure 5:
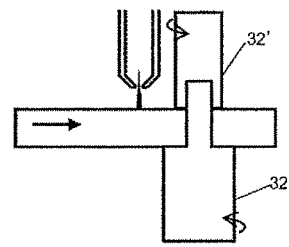
Figure 5:
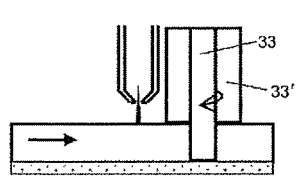
Figure 5:
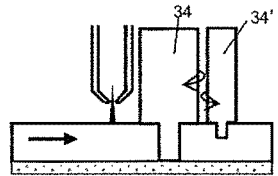
Figure 5:
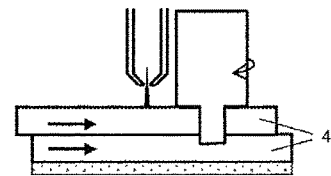

It is possible to employ such a structure that the rotation tool is inserted from the back surface as shown in FIG. 5 (a). In this case, since the molten metal easily leaks along gravity, it is preferable that the heating source is inserted from an upper portion of the to-be bonded material and the rotation tool is inserted from a lower portion of the to-be bonded material. Here, a back plate 6 for pressing the friction stir tool 3 against the to-be bonded material 4 is used. If this device structure is used, it is possible to carry out the heating melting step and the friction stir welding step almost at the same time.

As the friction stir tool, it is possible to appropriately use a convex tool including a shoulder and a probe (FIG. 5 (a)), a bobbin type tool 31 which sandwiches a to-be bonded material (FIG. 5 (b)), and a tool which sandwiches a to-be bonded material from both sides by a convex tool 32 and a concave tool 32' and in which these tools rotate in the opposite directions (FIG. 5 (c)). The present invention is not limited to specific one of the tools. If the bobbin type tool or the tool of both surfaces structure is used, it is possible to establish a device structure which does not use the back plate.

The shoulder and the probe of the friction stir tool may be integral as shown in FIG. 5 (a), but the tool may be an independent type tool having a non-rotation shoulder 33' provided on an outer periphery of a rotation probe 33 which friction stirs as shown in FIG. 5 (d). For example, if the bonding operation is carried out in a state where the probe is rotated and the shoulder is not rotated, the bonded surface can be finished into a beautiful surface having small roughness.

The friction stir welding equipment may include one rotation tool, but the equipment may include two or more tools and may friction stir the same portion two times (FIG. 5 (e)). For example, if equipment including a first tool 34 having a probe length necessary for the bonding operation and a second tool 34' having a short probe or no probe is used, cooling speed after the first friction stir welding can be made gentle.

A plurality of to-be bonded materials may be a butt joint as shown in FIG. 1, but the invention is not limited to this. Examples other than the butt joint are a lap joint (FIG. 5(f)), a T-shaped joint, a +-shaped joint, a corner joint, a fillet weld joint, a strap joint and an edge joint.

For the friction stir tool, it is preferable to use material which has high strength at high temperature and which is less prone to be worn during the bonding operation, and it is preferable to use any one of a carbide material, a tungsten alloy, an Ir alloy, a Ni alloy, a Co alloy, a PCBN (polycrystalline boron nitride), silicon carbide, silicon nitride, zirconium oxide, sialon and cermet.

As gas supplied from the nitrogen supply source, it is possible to use nitrogen, ammonia and mixture gas including nitrogen or ammonia.

The friction stir welded material obtained by the above-described friction stir method is formed such that it has a fine stir texture which is inherent in friction stir and a portion or entire bonded portion has higher nitrogen density as compared with a non-bonded portion. In the friction stir welded material of this embodiment, nitrogen density in a surface layer of the to-be bonded material of 0.2 mm or less from a surface which is friction stirred is higher than that of the non-treated portion, and the density difference is 0.01 wt % or more. If the difference in nitrogen density is not within this range, sufficient corrosion resistance cannot be secured.

It is especially preferable that the friction stir welded material is iron and steel material in which a to-be bonded material includes at least austenite, and it is preferable that the to-be bonded material is austenite-based stainless steel or austenite•ferrite-based stainless steel. Examples of thermal equilibrium texture of iron are ferrite, austenite and pearlite and among them, austenite having FCC lattice easily includes nitrogen and thus, more nitrogen can be included. When iron and steel are ferrite•austenite-based stainless steel, it is preferable that in a stirred zone formed after the bonding operation, a γ phase ratio showing an area ratio of austenite is 50% or more. If the γ phase ratio is lower than 50%, sufficient corrosion resistance cannot be secured.

However, the present invention is not limited to iron and steel including austenite, and the invention is useful also in all iron and steel materials including ferrite-based stainless steel, martensite-based stainless steel, chrome molybdenum steel, and nickel chrome molybdenum steel, and the invention is useful also in various kinds of structure materials including titanium, titanium alloy, zirconium, zirconium alloy, aluminum, aluminum alloy, magnesium and magnesium alloy.

Examples will be described below using Table 1.

EXAMPLES

TABLE 1

| Classification | Heating source | Nitrogen supply | Shield |
| --- | --- | --- | --- |
| Example 1 | Arc discharge torch | Yes | Presence |
| Example 2 | Arc discharge torch | Yes | Presence (two-layered structure) |
| Example 3 | Carbon dioxide laser | Yes | Presence |
| Example 4 | YAG laser | Yes | Presence |
| Comparative Example 1 | No heating source | No | Absence |
| Comparative Example 2 | Arc discharge | No | Presence |
| Comparative Example 3 | No heating source | Yes | Presence |
| Comparative Example 4 | Atmospheric pressure plasma torch (lower than melting point) | Yes | Presence |
| Comparative Example 5 | Carbon dioxide laser (lower than melting point) | Yes | Presence |

Test conditions of Example 1 will be described in detail. As a heating source, torch having a tungsten electrode used for TIG welding was used. As shown in FIG. 2, the tungsten electrode and the friction stir tool were arranged along a bonding direction. Mixture gas of argon and nitrogen was sent into the torch, the gas was sprayed and a to-be bonded material was melted. A volume ratio of nitrogen gas in the mixture gas was 10%. The torch was placed at a place separated from a surface by 3 mm, and a distance between the torch and the friction stir tool was set such that a distance between a center position where the arc discharge is irradiated and an outer periphery of the friction stir tool became 10 mm. The friction stir tool was made of sintered body of polycrystalline boron nitride (PCBN), and a probe and a shoulder were machined such that they were integral. A diameter of the shoulder was 17 mm and a length of the probe was 3 mm. Super two-phase stainless steel designated by S32750 in UNS standard was prepared as a to-be bonded material, and two plates having an outer size of 50 mm×300 mm×5 mm were butted against each other and the bonding test was carried out.

In the bonding test, the friction stir tool was rotated at a place sufficiently separated from the to-be bonded material and thereafter, the member was brought close to the tool and the probe was inserted. When the shoulder of the friction stir tool and a sliding part came into contact with the to-be bonded material, the arc discharge was started at the same time, and a surface of the to-be bonded material was locally melted. This state was held for one second and then, the to-be bonded material was moved along the bonding direction, and the butting bonding was carried out. Rotation speed of the tool was 250 rpm, an inclination angle was 3°, bonding speed was 300 mm/min, and a bonding length was 250 mm. Base current of the arc discharge was controlled in a range up to 400 A.

Across section of a test piece after the bonding operation was pulled out from a position separated away from a bonding-starting position by 125 mm, and it was checked whether there was a defect. Nitrogen density of the cross section was analyzed by Auger electron spectroscope. A phase ratio of a ferrite phase ($\alpha$) and an austenite phase ($\gamma$) of the two-phase stainless steel was calculated from an electron backscatter diffraction (EBSD) image. In a corrosion resistance test, critical pit initiation temperature (CPT) was measured. In a CPT test, a bonded test piece was cut into a size of 40 mm×40 mm×5 mm, the piece was removed from a bead surface by 0.2 mm and the piece was flattened and then, the piece was polished by sandpaper of No. 600 and was used. CPT of a base material of super two-phase stainless steel was about 70° C.

Example 2 used arc discharge torch, and two shield structures were layered as shown in FIG. 3. Pure argon was used as gas supplied to the torch, and pure nitrogen was supplied to the outer shield. Example 3 used a carbon dioxide laser as a heating source as shown in FIG. 4. The to-be bonded material was sufficiently melted by a laser to which heat input was locally added, and the to-be bonded material was brought into contact with nitrogen supplied to the shield. Example 4 has a similar structure to the Example 3, and a laser was changed to a YAG laser.

Comparative Example 1 is a conventional bonding method in which friction stir welding was carried out in the atmosphere. In Comparative Example 2, a heating operation was carried out using arc discharge torch in which nitrogen gas was not supplied and only argon was supplied, and the friction stir welding was carried out. In Comparative Example 3, a heating source was not used, a shield was placed around the friction stir tool and nitrogen was supplied, and the friction stir welding was carried out. In Comparative Example 4, atmospheric pressure plasma torch was used as the heating source and nitrogen was supplied, and the friction stir welding was carried out. The atmospheric pressure plasma torch used in Comparative Example 4 was characterized in that it generated plasma at temperature lower than that of the arc discharge torch, and the treatment temperature was limited to 500° C. or lower which is lower than the melting point of the to-be bonded material, and the friction stir welding was carried out. Comparative Example 5 was similar to Example 3 using the carbon dioxide laser, but a laser irradiation area was widened, the maximum temperature was lowered to 1,200° C. which is lower than the melting point of the to-be bonded material.

Figure 6:
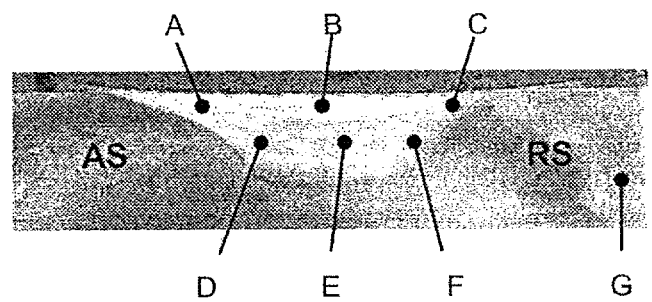
FIG. 6 illustrates one example of a cross section of a friction stir welded material. A, B and C show a position separated from a surface layer by 0.1 mm. D, E and F show a position separated from the surface layer by 1.5 mm. G shows a non-bonded portion

FIG. 6 shows one example of an optical microscope image of the friction stir welded material, and shows a cross section of the bonded material prepared in Example 1. According to the conventional friction stir welding shown in Comparative Example 1, if the number of rotations is increased and heat input is increased, a local segregation such as chrome becomes large, and if the number of rotations is reduced and heat input is reduced, a bonding defect is formed and sufficient bonding strength cannot be secured, and a condition which satisfies both corrosion resistance and strength cannot be established. At this time, there is a tendency that nitrogen density in the vicinity of the surface layer is slightly lowered as compared with the base material by a reaction in which nitrogen is discharged into atmosphere during the bonding operation. In Example 1, on the other hand, nitrogen density in surface layers A, B and C increased more than 0.01 volume % than G of the non-bonded portion, and nitrogen content which was equal to or greater than that of the non-bonded portion was secured even in the locations D, E and F which were separated from the surface layer by 1.5 mm. A $\gamma$ phase ratio showing a ratio of austenite phase of two-phase stainless steel became 30% or less at a position of a depth 0.1 mm from a surface of RS at the stirred zone of Comparative Example 1 depending upon locations, but in the location C of Example 1, a $\gamma$ phase ratio of 50% or higher was secured. In Comparative Example 1, CPT was 45° C. but in Example 1, it was as high as 65° C.

Similarly, in any of Examples 2 to 4, friction stir welded material having no defect could be formed, and the bonded portion had high nitrogen density. At a position separated from the surface by 0.1 mm, it was confirmed that nitrogen density of the bonded portion was higher than the non-bonded portion by 0.01 volume % or more. All of $\gamma$ phase ratios were 50% or more, and a reduction width from 55% of the base phase was 5% or less. Nitrogen has an effect to enhance the corrosion resistance of material and to stably form iron and steel austenite phase. All of Examples 2 to 4 had CPT of 50° C. or higher. Especially, results of the Examples 1, 2 and 3 were excellent, and CPT was 60° C. or higher and close to values of the original materials. In Comparative Examples 2 to 5, on the other hand, a sufficient nitrogen amount could not be added, and CPT of the bonded portion was lower than 50° C.

In Examples 1 and 2, a molten pool was formed by setting a heat input amount H shown in the equation (1) to 1 kJ/cm or higher, and sufficient nitrogen could be added. It could be confirmed that sufficient corrosion resistance could be secured irrespective of the shield structure but in Example 1, a surface of the tungsten electrode was contaminated with nitrogen compound after the test and in Example 2, the electrode surface was not contaminated. This result showed that in order to continuously stably carry out the bonding operation, it was preferable to have a two-layered shield structure as in Example 2.

Example 4 using the YAG laser had sufficient characteristics, but nitrogen content was smaller than that of Example 3 which used the carbon dioxide laser. A wavelength of the carbon dioxide laser is about 10 μm and a wavelength of the YAG laser is about 1 μm, and the carbon dioxide laser easily excites nitrogen ion. Hence, the test showed that reaction of a surface is more active in the carbon dioxide laser, more nitrogen could be included, and the carbon dioxide laser was more preferable.

In the case of Comparative Example 2 using the arc discharge torch in the atmosphere, since large amount of oxygen in the atmosphere reacted in priority to nitrogen and the oxygen hindered addition of nitrogen. In Comparative Example 3 in which the heating source was not used and friction stir welding was carried out in the nitrogen atmosphere, reaching temperature at the time of the bonding operation was about 1,200° C. which was lower than the melting point, and there was almost no nitrogen which diffused from the surface. Also in Comparative Example 4 in which the atmospheric pressure plasma of nitrogen was used as the heating source, nitrogen could not be added. The atmospheric pressure plasma had an effect to remove oxide on the surface layer, nitrogen could be added even at a low temperature of 500° C. or lower, a cross section texture was checked and a depth formed by increasing nitrogen was limited to 10 μm or less. To diffuse nitrogen from the surface under the atmospheric pressure, sufficient time was necessary, and nitrogen was not sufficiently added. In Comparative Example 5 in which it is heated to temperature lower than the melting point by the carbon dioxide laser, nitrogen was not added sufficiently.

REFERENCE SIGNS LIST

1 nitrogen supply source (nitrogen gas supply pipe)
2 heating source
3 friction stir tool
31 bobbin type tool
32 convex tool
32' concave tool
33 rotation probe
33' non-rotation shoulder
34 tool
34' tool
4 to-be bonded material
5 bonding bead
6 back plate
71 electrode
72 arc discharge
81 optical resonator
82 carbon dioxide laser
9, 10, 11 shield wall

The invention claimed is:

1. A friction stir welding method for bonding a to-be bonded material, comprising:
a step of supplying nitrogen and introducing the nitrogen into the to-be bonded material within a first shield wall, the first shield wall disposed over and around a portion of the to-be bonded material and around a friction stir tool, while melting the to-be bonded material;
a step of friction stir welding, by the friction stir tool, a portion of the to-be bonded material in which the nitrogen is introduced, the step of friction stir welding being performed continuously at the same time as the step of supplying and introducing the nitrogen; and
concurrently with the step of introducing nitrogen, a step of supplying and introducing argon into the to-be bonded material within a second shield wall partially disposed within the first shield wall.

2. The friction stir welding method according to claim 1, wherein in the step of introducing the nitrogen and the step of friction stir welding being performed continuously at the same time, at least a portion of the to-be bonded material maintains an austenite phase.

3. The friction stir welding method according to claim 1, wherein the to-be bonded material is melted by arc discharge or a carbon dioxide laser.

4. The friction stir welding method according to claim 1, wherein the to-be bonded material is melted by arc discharge, and a heat input amount is 1 kJ/cm or more.

* * * * *